Nov. 22, 1955     H. W. TREVASKIS     2,724,565
FEEL SIMULATOR SYSTEM FOR AIRCRAFT
Filed March 23, 1953     3 Sheets—Sheet 1
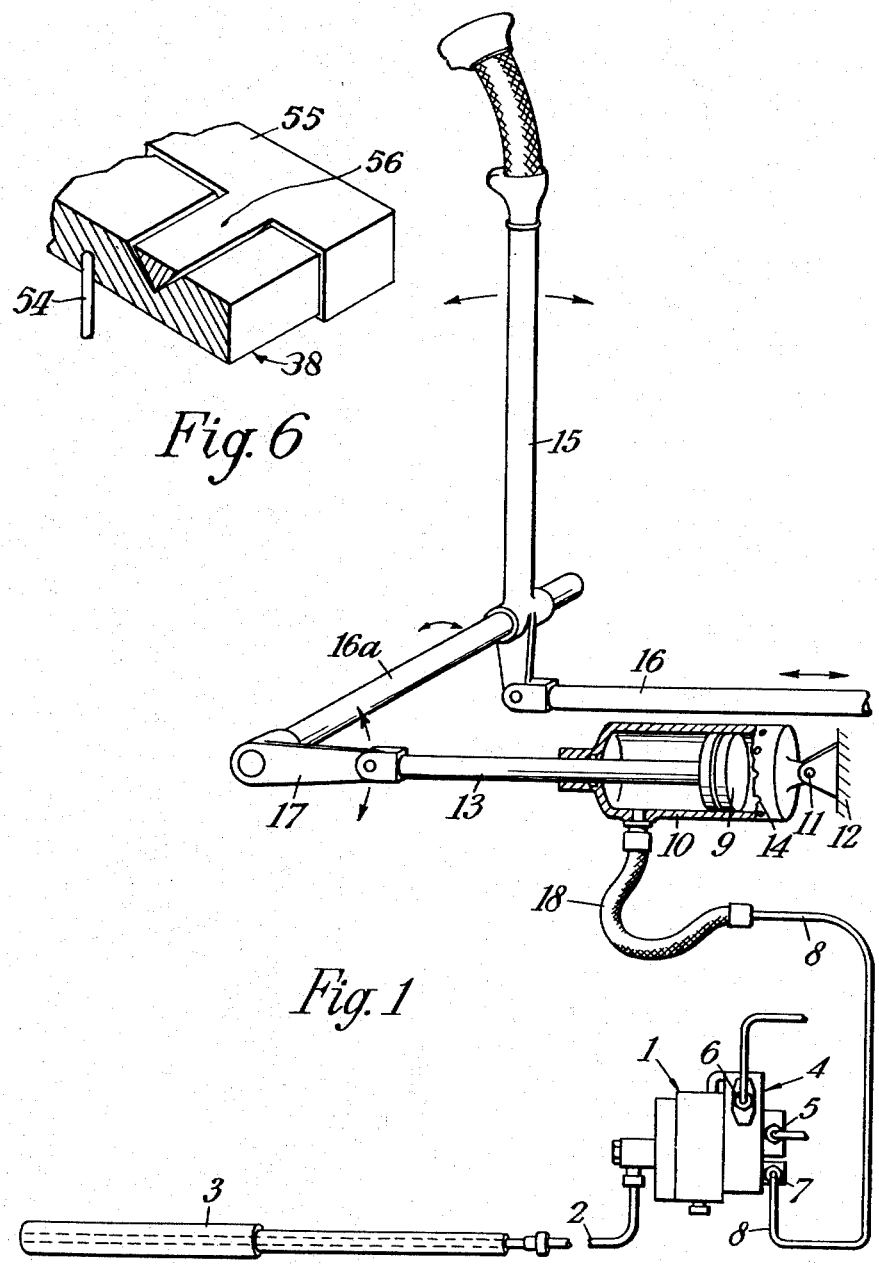

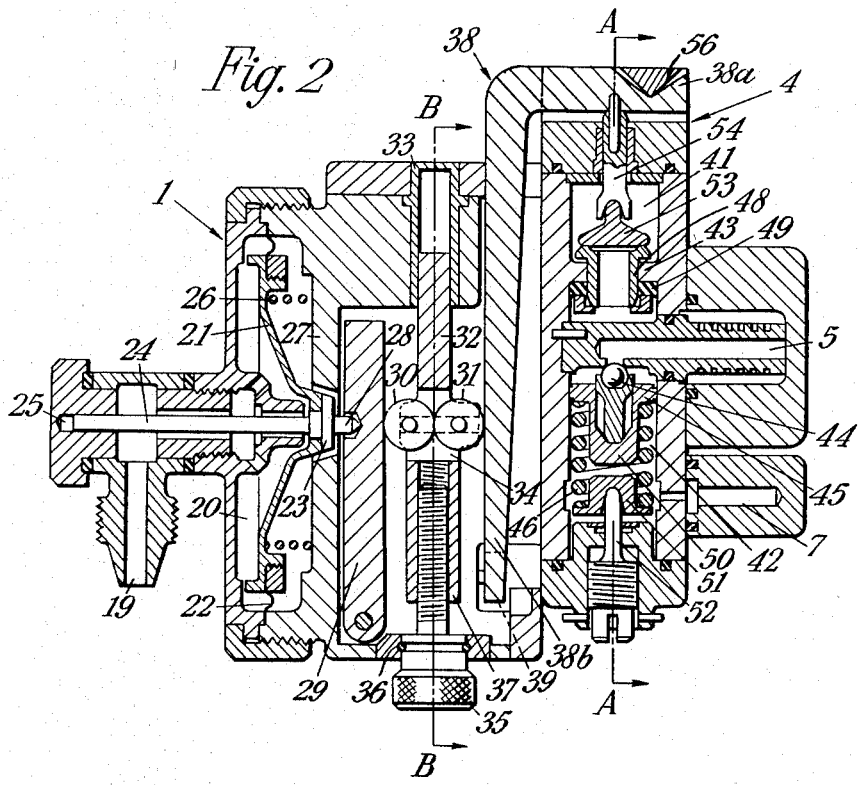

Nov. 22, 1955     H. W. TREVASKIS     2,724,565
FEEL SIMULATOR SYSTEM FOR AIRCRAFT
Filed March 23, 1953     3 Sheets-Sheet 3
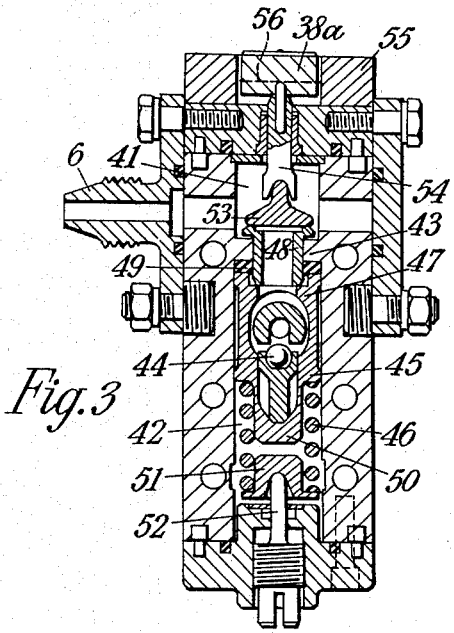
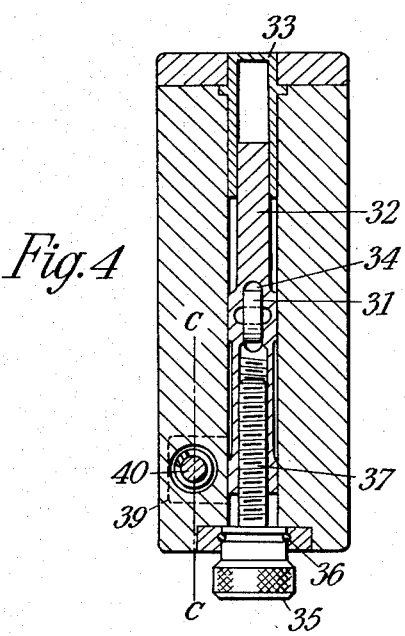
INVENTOR
Henry William Trevaskis
by Benj. T. Rauber
his attorney

United States Patent Office 2,724,565
Patented Nov. 22, 1955

2,724,565

FEEL SIMULATOR SYSTEM FOR AIRCRAFT

Henry William Trevaskis, Solihull, England, assignor to Dunlop Rubber Company Limited, London, England, a British company Application March 23, 1953, Serial No. 344,052

Claims priority, application Great Britain April 1, 1952

11 Claims. (Cl. 244—83)

My invention relates to a feel simulator system for aircraft which is adapted to simulate the "feel" of an aircraft at a pilot's powered controls.

Due to their large size and high speed many modern aircraft are provided with fully powered controls, and in such cases it is desirable that some form of artificial feel should be provided. Preferably the feel varies with some function of the aircraft speed, and it is also desirable that the degree of intensity of feel should vary with the operational function of the aircraft and also, to a certain extent with individual pilot's preferences.

My invention provides a feel simulator in which a fluid pressure resistance is offered to movement of the controls, elevator or rudder or both, and in which the fluid pressure is a function of the speed of the air craft. The fluid pressure may be applied in such manner as preferably to cause a progressive increase in the resistance to movement of the controls for a given fluid pressure as the controls are moved farther from a mid point.

In a preferred form of my invention, movement of the control in either direction from a mid or neutral point moves a piston or equivalent element against a fluid under pressure. The movement of the control may be transmitted to the piston through a linkage or other transmission to increase the mechanical advantage of the fluid pressure with movement in either direction from the mid or neutral position. Fluid under pressure is supplied to the piston through a valve mechanism to maintain a continuous pressure which may, however, be varied in accordance with the speed of the aircraft. The speed of the aircraft may be transformed into fluid pressure by means of a Pitot tube, for example, and act against a movable element, for example, a movable end wall or diaphragm of a closed chamber from which the movement or pressure is transmitted by a suitable transmission to the valve mechanism. This transmission preferably comprises a lever bearing against an exhaust valve of the valve mechanism and receiving the thrust of the movable wall at a point on the lever which may be shifted to vary the mechanical advantage of the transmission. The lever acts with a pressure proportional to that on the movable wall to press the exhaust valve to closed position and then to open an inlet valve from a supply to the piston until a pressure is built up in the valve mechanism and against the piston to balance or over balance the pressure on the movable wall, whereupon the inlet valve is closed and, upon a drop in pressure against the movable wall, the exhaust valve is opened. The pressure on the piston is therefore proportional to the pressure on the movable wall generated by the speed of the aircraft when the air craft is in motion. A slight initial pressure is imposed on the transmission lever by a spring to provide an initial pressure on the piston when the aircraft is not in motion.

In order that the invention shall be more fully described reference is made to the accompanying drawings in which:

Figure 1 is a diagrammatic sketch of a feel simulator system for elevator control surfaces in accordance with the present invention.

Figure 2 is a section through an automatic control and valve mechanism.

Figure 3 is a section through the valve mechanism on the line A—A of Figure 2 and looking in the direction of the arrows.

Figure 4 is a section through the automatic control mechanism of Figure 2 taken on the line B—B and looking in the direction of the arrows.

Figure 5 is a part section through the lines C—C of Figure 4 showing details of the spring-loaded plunger; and Figure 6 is a part section and part perspective view of a detail of the floating lever forming an element of the invention.

The feel simulator system (Figure 1) comprises an automatic and adjustable control mechanism 1 operatively connected by pressure line 2 to a Pitot head 3 presented in front of the aircraft. Secured to said control mechanism and operated thereby is a valve mechanism 4 having an inlet 5 connected to a source of fluid pressure, an exhaust 6 connected to a fluid reservoir and an outlet 7 connected by pressure line 8 with one side of a piston 9 fluid-tightly slidable in a cylinder 10. The cylinder is provided at one end with a pivotal connection 11 to a part 12 of the aircraft structure. A rod 13 extends from one side of the piston and is fluid-tightly slidable through one end of the cylinder. The end of the cylinder remote from said rod is provided with breathing vents 14. A pilot's control stick 15 is provided, operatively connected through rod 16 with the fluid pressure actuators (not illustrated) associated with the elevators which control the pitch of the aircraft. Secured at right angles to the control stick 15, at the fulcrum thereof, is an oscillatable rod 16a to the end of which is secured a link 17. The link is pivotally secured to the end of rod 13 so that movement of the control stick in a fore and aft direction not only operates the fluid pressure actuators thereby to control movement of the elevators, but also oscillates rod 16. This angularly moves link 17 to slide the ram 9 along its cylinder 10. The cylinder is pivotally secured to the fixed part 12 of the aircraft to enable it to keep in alignment with the end of link 17 and a length of flexible hose 18 is inserted between the cylinder and pressure line 8.

The automatic and adjustable control mechanism 1 (Figure 2) comprises a housing having a nozzle 19 adapted to be connected to said Pitot head. Said nozzle communicates with a circular pressure chamber 20 one end wall of which is movable and comprises a dished disc 21. The inner peripheral edge of a flexible and air-impermeable annual diaphragm 22 is fluid-tightly secured to the outer periphery of the disc and the outer periphery of said diaphragm is fluid-tightly secured between two parts making up the peripheral wall of the pressure chamber. A guide is provided, having a head 23 secured fluid-tightly to the centre of the disc and a stem 24 extending axially away from said disc, through the pressure chamber, and slidably fitting in a hole 25 in a part of the housing. The hole and stem are coaxial with the disc and with the pressure chamber, and thus the disc is caused to move, when the chamber is pressurized, along the longitudinal axis of the chamber and against a helically-wound spring 26 located between said disc and a part 27 of the housing.

Said part 27 of the housing is provided with an aperture, coaxial with the guide, through which the head of the guide projects, and the head is provided with a pointed end 28 which seats in a recess intermediate the ends of a lever arm 29 which is pivotally connected at one end to said housing. The lever arm in turn abuts the periphery of one of a pair of rollers 30 and 31 each of which is rotatable on a spindle, and the spindles are slidable in a slot extending transversely across a carriage 32 one end of which is slidable in a sleeve 33 secured to a part of the housing and the other end of which is provided with a threaded hole, co-axial with said carriage. The axis of the carriage is substantially parallel to that of the lever arm and the axis of the slot is parallel to the axis of the guide. The intermediate part of the carriage is flat and is provided with a recess 34 to accommodate the rollers, which are in side by side relationship, one abutting the other, and which are substantially in line with the head of the guide on the other side of the lever arm. A knurled adjusting knob 35 is mounted in bearings 36 in the wall of the housing adjacent the threaded end of the carriage, said knob being axially-aligned with said end and a screwed member 37 integral with and extending from said knob is screwed into the threaded hole in said end of the carriage. Rotation of the knob in one direction or the other will thus move the carriage up and down the housing, the rollers moving with the carriage.

Rigidly secured adjacent this side of the control mechanism housing is a fluid pressure valve mechanism 4 which comprises a casing of substantially rectangular section. An operating lever 38 bent at right angles has the end of one shorter arm 38a pivotally secured to the top of said casing and the other longer arm 38b extending adjacent the longer axis of the casing. This longer arm extends through a slot in the control mechanism housing wall and into the control mechanism. The end of the said longer arm remote from the shorter arm is provided with a flange 39 (Figures 4 and 5) at right angles thereto and said flange abuts a spring-loaded plunger 40 located within the housing and tending to force said end towards the casing of the valve mechanism. The rating of the spring is of a predetermined value. The roller 31 remote from said lever arm 29 abuts the longer arm 38b of the operating lever intermediate its ends.

Two pressure-tight and co-axial chambers, an exhaust chamber 41 and an operating chamber 42 are located within the casing. The exhaust chamber is provided with an outlet 6 (Figure 3) for connection to a fluid reservoir, and the operating chamber is provided with an outlet 7 for connection to the end of the cylinder 10 in which the piston 9 connected to the pilot's control stick is slidably fitted. A wall 43 separating said two chambers is provided centrally with a circular hole.

An inlet connection 5 is fitted in fluid-tight manner through a side wall of the casing and extends into the operating chamber 42 intermediate the two ends of said chamber. The inlet connection is adapted to be connected to a source of fluid pressure and the end of the connection within the operating chamber has a portion at right angles thereto which is co-axial with the longitudinal axis of the housing and which extends towards the end of the chamber remote from the exhaust chamber. The end of the inlet connection within the chamber, and presented towards the end of the chamber remote from the exhaust chamber, provides a seating for a ball 44, having a diameter slightly greater than the hole in the inlet connection. Said ball is adapted to seat over said hole, and is retained in a recess in a cradle 45 which is urged by a spring 46 to force said ball towards said seating. The cradle is provided with a portion 47 (Figure 3) extending substantially axially of the casing towards the exhaust chamber, and seated on this end is a tubular portion 48 which slidably extends through the hole in the wall between said two chambers, the end thereof in the exhaust chamber being formed as a valve seat. A sealing ring 49 is provided to ensure a fluid-tight fit. The spring 46 is positioned by two spring guides, one, 50, being formed in integral with the lower end of the cradle and the other, 51, being located on the end of an adjustable stem 52 which extends fluid-tightly through the bottom of the housing.

Movable within the exhaust chamber is a valve 53 which is adapted to seat on the valve seat projecting through into said chamber from the operating chamber, and abutting the side of the valve remote from the valve seat is an operating plunger 54 which slidably extends through an axial hole in the end of the casing.

A bridgepiece 55 is secured to this end of the casing and a knife-edge 56, secured thereto, extends downwardly towards the end of the casing, Fig. 6. The shorter arm 38a of the operating lever is provided, adjacent one end, with a complementary knife-edge slot. The lever is fitted to the casing with the knife edge and slot engaging and the short arm bearing on the adjacent end of the operating plunger 54. As described, the longer arm 38b of the lever extends at right angles into the control mechanism and bears against the spring-loaded plunger and the roller 31. This type of valve mechanism is fully described in my British Patent Number 687,359, U. S. application Serial No. 200,021, filed Dec. 6, 1950.

The working of the control mechanism will now be described in conjunction with the fluid pressure valve mechanism. With the pressure chamber 20 of the control mechanism 1 non-pressurized, i. e. when the aircraft is stationary, the only force applied to the longer arm 38b of the operating lever is that applied by the spring-loaded plunger 40. This exerts a known and predetermined force on the end of the operating lever 38b and, acting through said lever, forces the operating plunger 54 further into the exhaust chamber 41. The actual movement of the operating plunger is very small. The exhaust valve 53 is normally seated, so that this downward force, acting through the exhaust valve seat 48 forces the cradle 45 downwardly against the associated spring 46. The inlet valve 44 is thus allowed to crack and allow pressure fluid from the source to flow into the operating chamber 42 and thence into the cylinder 10 in which the ram 9 is slidable.

The pressure in the operating chamber and cylinder increases until the pressure in the operating chamber, acting upwardly on the effective area of the exhaust valve, is sufficient to overcome the downward force exerted through the lever by the plunger spring. When this occurs the exhaust valve will be moved upwardly, the exhaust valve seat associated with the spring-urged cradle following the movement of the exhaust valve to maintain said valve closed, until the inlet valve is closed once more.

A fluid pressure, determined by the rating of the spring of the plunger, will thus be held in the operating chamber and in the cylinder on one side of the ram and this pressure in the cylinder will impart a certain amount of resistance to movement of the ram, and hence of the pilot's control stick, even when the aircraft is stationary.

When the aircraft is moving, however, the pressure build-up in the Pitot head 3 is communicated to the pressure chamber 20 of the control mechanism 1. The movable end wall 21 is moved by said increase in pressure, the head 23 associated with said end wall and abutting the lever arm angularly moving said arm away from the pressure chamber. The arm contacts the roller 30 and since the two rollers engage one another and the roller 31 abuts the long arm 38b of the lever 38 of the pressure control mechanism 4 then the force exerted by the pressure on the movable end wall is transmitted through said parts to the long arm of the lever intermediate its ends.

Movement of the lever will further pivot it about its knife edge fulcrum, and the operating plunger will be forced still further into the exhaust chamber. This will crack the inlet valve in the manner hereinabove described to allow a further flow of pressure fluid into the operating chamber, until the pressure in the chamber, acting on the effective area of the exhaust valve, is sufficient to overcome the additional load on the plunger, when the plunger will be forced back to allow the inlet valve to seat once more.

This additional pressure in the operating chamber will also flow into the cylinder and will appreciably increase the amount of resistance to movement of the piston and hence of the pilot's control stick. This resistance will increase directly with the increase in pressure in the Pitot head which itself is largely a function of the aircraft speed. Thus the conditions at the aircraft control surfaces will be substantially reproduced at the pilot's control stick.

As the speed of the aircraft drops so does the pressure in the Pitot head, and the force exerted on the lever of the valve mechanism is correspondingly reduced. The pressure in the operating chamber acting upwardly on the exhaust valve thus exceeds the downward force on said valve with the result that the valve blows and allows surplus pressure fluid to flow into the exhaust chamber and thence to the fluid reservoir. The pressure in the cylinder acting on the piston also drops, with a reduction in the effort to be used by the pilot in operating his control stick. With the aircraft stationary the pressure in the cylinder and in the operating chamber will merely be that pressure commensurate with the force of the spring-loaded plunger on the lever.

It is frequently desirable that the feel characteristics should be modified to accord with the operational functions of the aircraft and also with the individual preferences of the pilot. This may be achieved by rotation of the screwed knob 35 associated with the screwed member 37 of the control mechanism. Rotation of the knob in one direction will move the carriage 32 including the rollers 30 and 31 away from the knob, and rotation in the other direction will move the stem and rollers towards the knob. This will affect the mechanical advantage of the lever arm and accordingly vary the load on the plunger which operates the control mechanism.

The valve mechanism is balanced, and very little force is required to crack the inlet valve. The mechanism is thus very sensitive in operation. This type of valve mechanism, and the advantages accruing therefrom are more fully described in my British Patent No. 687,358, U. S. application Ser. No. 200,021, filed September 13, 1952.

In the system described, the fluid pressure from the valve mechanism is fed to one side of the piston only. The cylinder is pivotally secured to a fixed part of the aircraft and the piston is so linked to the control stick that movement of the control stick from its mid position in either a fore or aft direction will slide the ram along the cylinder against said fluid pressure, hence imparting the requisite "feel" characteristic. The same effect may be achieved, however, in another embodiment of the invention (not illustrated) by making the piston slidable with the control rod 16 in a rigid cylinder, and admitting independently equal fluid pressures to both sides of the piston.

Each of the two mechanisms, i. e. the control mechanism and the valve mechanism, may be used independently of one another and of the system.

Whilst the present invention has been described in connection with artificial feel for elevator surfaces, it may of course be applied to aileron or rudder surfaces, in which case the outlet connection of the valve mechanism is connected to cylinders containing pistons operatively linked to the manual controls of such aileron or rudder surfaces.

Having how described my invention, what I claim is:

1. A feel simulator for aircraft powered controls comprising a movable wall to receive pressure generated by the speed of the aircraft, a piston movable by an aircraft control, a fluid pressure valve mechanism to control the supply of pressure fluid to said piston in a direction to oppose movement of said control and comprising an exhaust valve movable in one direction to and past closed position and movable in the reverse direction by fluid pressure supplied to said piston and an inlet valve movable to open position by movement of said exhaust valve past closed position, and a transmission from said movable wall to said exhaust valve to transmit pressure from said movable wall to said exhaust valve in a direction to close said valve.

2. A feel simulator system for aircraft powered controls according to claim 1 wherein the movable end wall abuts a lever arm pivotally secured at one end to said housing and adjustable means are provided between the lever arm and one arm of a lever mechanism of said fluid pressure valve mechanism for adjusting the mechanical advantage.

3. A feel simulator system for aircraft powered controls according to claim 2 wherein said adjustable means comprises a pair of rollers mounted in side by side relationship on spindles which are laterally slidable in a slot in a carriage-member, and said carriage-member is movable in a plane substantially parallel to that of the lever arm on rotation of an adjusting knob having a screw-threaded connection with said carriage member, whereby the mechanical advantage of said lever mechanism may be varied.

4. A feel simulator system for aircraft powered controls according to claim 3 wherein a spring-loaded plunger abuts the end of said arm of the lever mechanism, whereby the arm is pre-loaded to a degree determined by the rating of said spring.

5. A feel simulator system for aircraft powered controls according to claim 1 wherein said movable end wall comprises a spring-loaded disc the outer periphery of which is secured by means of a flexible annular diaphragm to the inner periphery of the pressure chamber.

6. A feel simulator system for aircraft powered controls according to claim 5 wherein said fluid pressure valve mechanism comprises a housing containing an operating chamber connected to said cylinder and a co-axial exhaust chamber connected to a fluid reservoir, a co-axial passage between said chambers, an inlet connection connected to a source of fluid pressure and communicating with said operating chamber through an inlet valve, a cradle axially slidable in the operating chamber and associated with said inlet valve, a compression spring urging the cradle in a direction to close the inlet valve, an exhaust valve seat in the exhaust chamber having a tubular portion slidably fitting in the passage between said two chambers and seating on the adjacent end of the cradle, an exhaust valve seating on said exhaust valve seat and a plunger slidable in a hole in the exhaust chamber and projecting exterior of said housing, whereby a load on said plunger in one direction first closes the exhaust valve and then compresses the spring to allow the inlet valve to open and pressure fluid to flow into the operating chamber until the pressure in said chamber, acting on the face of the exhaust valve, overcomes the load on the plunger to move the valve and allow the inlet valve to close.

7. A feel simulator system for aircraft powered controls according to claim 6 wherein the arm of the lever mechanism associated with the control mechanism is provided at one end with a portion at right angles thereto, said portion being pivotally secured to the housing and associated with the plunger of the valve mechanism, whereby movement of the lever in one direction will force the plunger inwardly of the housing.

8. A control mechanism comprising a housing having a pressure chamber therein adapted to be connected to a source of fluid pressure, a movable end wall at one end of said pressure chamber having a portion thereof abutting a lever arm pivotally secured at one end to said housing, a carriage member located within the housing having a pair of rollers mounted in side-by-side relationship on spindles which are laterally slidable in a slot in said member, one of said rollers abutting the lever arm and the other roller abutting the operating arm of a mechanism to be operated, and means to move the carriage member in a plane substantially parallel to the lever arm comprising an adjusting knob having a screw-threaded connection with said carriage member.

9. The feel simulator of claim 1 in which said transmission comprises a lever acting on said exhaust valve and receiving an actuating thrust from said movable wall.

10. The feel simulator of claim 2 having means to shift the point of application of said thrust toward or from the fulcrum of said lever.

11. The feel simulator of claim 1 in which said movable wall is an end wall of an expansible chamber and in which a Pitot tube is connected to said chamber.

References Cited in the file of this patent

UNITED STATES PATENTS

| | | |
|---|---|---|
| 721,499 | Brennan | Feb. 24, 1903 |
| 2,073,838 | Hammond et al. | Mar. 16, 1937 |
| 2,382,941 | Moore | Aug. 14, 1945 |
| 2,508,883 | Knowler et al. | May 23, 1950 |
| 2,548,481 | Knowler et al. | Apr. 10, 1951 |
| 2,560,914 | Almeras | July 17, 1951 |